(12) United States Patent
Katsuzawa et al.

(10) Patent No.: US 7,153,030 B2
(45) Date of Patent: Dec. 26, 2006

(54) ROLLING BEARING SYSTEM

(75) Inventors: Yukio Katsuzawa, Minamitsuru-gun (JP); Yasuyuki Nakazawa, Fujiyoshida (JP); Taku Oohara, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 103 days.

(21) Appl. No.: 11/019,714

(22) Filed: Dec. 23, 2004

(65) Prior Publication Data

US 2005/0141796 A1 Jun. 30, 2005

(30) Foreign Application Priority Data

Dec. 25, 2003 (JP) .............................. 2003-430111

(51) Int. Cl.
*F16C 33/66* (2006.01)
(52) U.S. Cl. ...................... 384/473; 384/462; 384/471
(58) Field of Classification Search ................ 384/473, 384/462, 466, 471, 472, 474
See application file for complete search history.

(56) References Cited

U.S. PATENT DOCUMENTS 3,749,459 A 7/1973 Matuzaki et al.

4,408,808 A 10/1983 Redmann, Jr. et al.
5,484,212 A 1/1996 Guaraldi et al.

FOREIGN PATENT DOCUMENTS

| DE | 29 19 490 A1 | 11/1980 |
|---|---|---|
| DE | 29 19 487 A1 | 12/1980 |
| JP | 5-92538 U | 12/1993 |
| JP | 2518950 Y2 | 9/1996 |
| JP | 2540977 Y2 | 4/1997 |

*Primary Examiner*—Lenard A. Footland
(74) *Attorney, Agent, or Firm*—Drinker Biddle & Reath LLP

(57) ABSTRACT

A rolling bearing system provided with an inner ring including a first raceway surface, an outer ring including a second raceway surface, a rolling element retained between the inner ring and the outer ring and capable of rolling along the first raceway surface and the second raceway surface, and a lubricant storage section incorporated in a bearing structure. The lubricant storage section includes a grease tank arranged between the inner and outer rings for storing a grease, and a grease pressing mechanism for pushing the grease stored in the grease tank out of the grease tank to supply the grease to the rolling element and the first and second raceway surfaces. The inner ring includes a first extending surface adjoining the first raceway surface, and the outer ring includes a second extending surface adjoining the second raceway surface and facing the first extending surface. The grease tank is housed in an annular space defined between the first and second extending surfaces.

7 Claims, 5 Drawing Sheets

ROLLING BEARING SYSTEM

BACKGROUND OF THE INVENTION

1. Field of the Invention

The present invention relates to a rolling bearing system.

2. Description of the Related Art

Generally, it is known that the service life of a rolling bearing involves a life depending on a metal fatigue of each component, caused by a load applied to rolling elements and raceway surfaces of bearing rings (so called "a rolling contact fatigue life"), and a life depending on a degradation of a grease used to provide a lubricating oil film between the rolling elements and the raceway surfaces (so called "a grease life"). The rolling contact fatigue life tends to be improved with the recent improvement of the cleanliness of bearing materials. As for the grease life, however, the grease confined between the bearing rings (i.e., an inner ring and an outer ring) usually cannot contribute to improve the lubricity of portions of components, other than portions contacting with the surface of the rolling elements and the raceway surface as well as portions near the contacting portions. Therefore, the grease is generally liable to be easily degraded, and the resultant lubrication failure constitutes a main factor determining the service life of the bearing.

Conventionally, in order to improve the grease life, measures have been taken such that new grease is supplied from a source external to the bearing. However, in these measures, the grease is generally supplied to the bearing through a tube from an external grease source, which may complicate a grease supply passage. Also, a certain post-machining is required to form a grease pouring hole in the bearing ring (e.g., the outer ring) or to form a grease supply channel in a housing onto which the bearing ring (e.g., the outer ring) is secured.

On the other hand, a configuration in which a lubricant storage section is provided inside the bearing has been conventionally proposed. For example, Japanese Utility Model No. 2540977 (JP-Y2-2540977) discloses a double-row type rolling bearing including an inner ring spacer defining a lubricant storage space. The inner ring spacer is arranged between a pair of inner rings, and includes an inner peripheral part and an outer peripheral part fitted to the inner peripheral part. The lubricant storage space for storing a lubricant is formed between the inner and outer peripheral parts. A minute lubricant outflow passage is formed on a fitting interface between the inner and outer peripheral parts of the inner ring spacer, so as to extend from the lubricant storage space to open toward the neighborhood of the raceway surface of the inner ring.

Also, Japanese Utility Model No. 2518950 (JP-Y2-2518950) discloses a double-row type rolling bearing including an inner ring spacer defining a lubricant storage space. The inner ring spacer is provided with an annular groove for holding the lubricant, along the inner peripheral surface adapted to be fitted to a shaft. Also, the inner ring space is provided with a pair of through holes opening in opposite axial-end surfaces thereof and formed to communicate with the annular groove. These through holes act as lubricant supply passages and open toward the neighborhood of the raceway surfaces of the pair of inner rings.

Further, Japanese Unexamined Utility Model Publication (Kokai) No. 5-92538 (JP-U-5-92538) discloses a roller bearing in which a rolling element (or a roller) has a hollow structure and a lubricant is filled in the interior space of the rolling element. A cap is attached to an opening of the internal space, which is formed in an axial end face of the hollow roller. A minute gap is defined in a fitting interface between the roller opening and the cap, so as to form a lubricant outflow passage.

The above-described conventional structures, in which a lubricant storage section is incorporated inside a bearing, require a machining or other process for forming a space for holding a lubricant in an inner ring spacer or a rolling element (or a roller).

SUMMARY OF THE INVENTION

It is an object of the present invention to provide a rolling bearing system, in which a lubricant storage section is incorporated inside a bearing structure, and which can minimize a machining or other process for forming the storage section in the components of the bearing structure, such as a bearing ring or a rolling element.

It is another object of the present invention to provide an electric motor capable of improving the life of a rolling bearing supporting a rotor shaft.

To accomplish the above objects, the present invention provides a rolling bearing system, comprising an inner ring including a first raceway surface; an outer ring including a second raceway surface; a rolling element retained between the inner ring and the outer ring and capable of rolling along the first raceway surface and the second raceway surface; a grease tank arranged between the inner ring and the outer ring for storing a grease; and a grease pressing mechanism for pushing the grease stored in the grease tank out of the grease tank to supply the grease to the rolling element, the first raceway surface and the second raceway surface.

In the above rolling bearing system, the inner ring may include a first extending surface adjoining the first raceway surface, the outer ring may include a second extending surface adjoining the second raceway surface and facing oppositely to the first extending surface, and the grease tank may be housed in an annular space defined between the first extending surface and the second extending surface.

In this arrangement, at least one of the first extending surface and the second extending surface may extend in an outwardly expanding fashion as viewed from a rotational center of the rolling element.

Also, the grease tank may have an annular shape extending along entire circumferences of the inner ring and the outer ring, and at least one grease outlet for expelling the grease may be formed at a predetermined circumferential position on the grease tank to open toward the rolling element.

The rolling bearing system as described above may further comprise a shield plate arranged between the inner ring and the outer ring for holding the grease between the inner ring and the outer ring, wherein the grease tank is fixedly supported on the shield plate.

The grease pressing mechanism may include a compressed air source connected to the grease tank.

The present invention further provides an electric motor, comprising a stator; a rotor; and a rolling bearing system having various features as described above, for rotatably supporting the rotor relative to the stator.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

Figure 1:
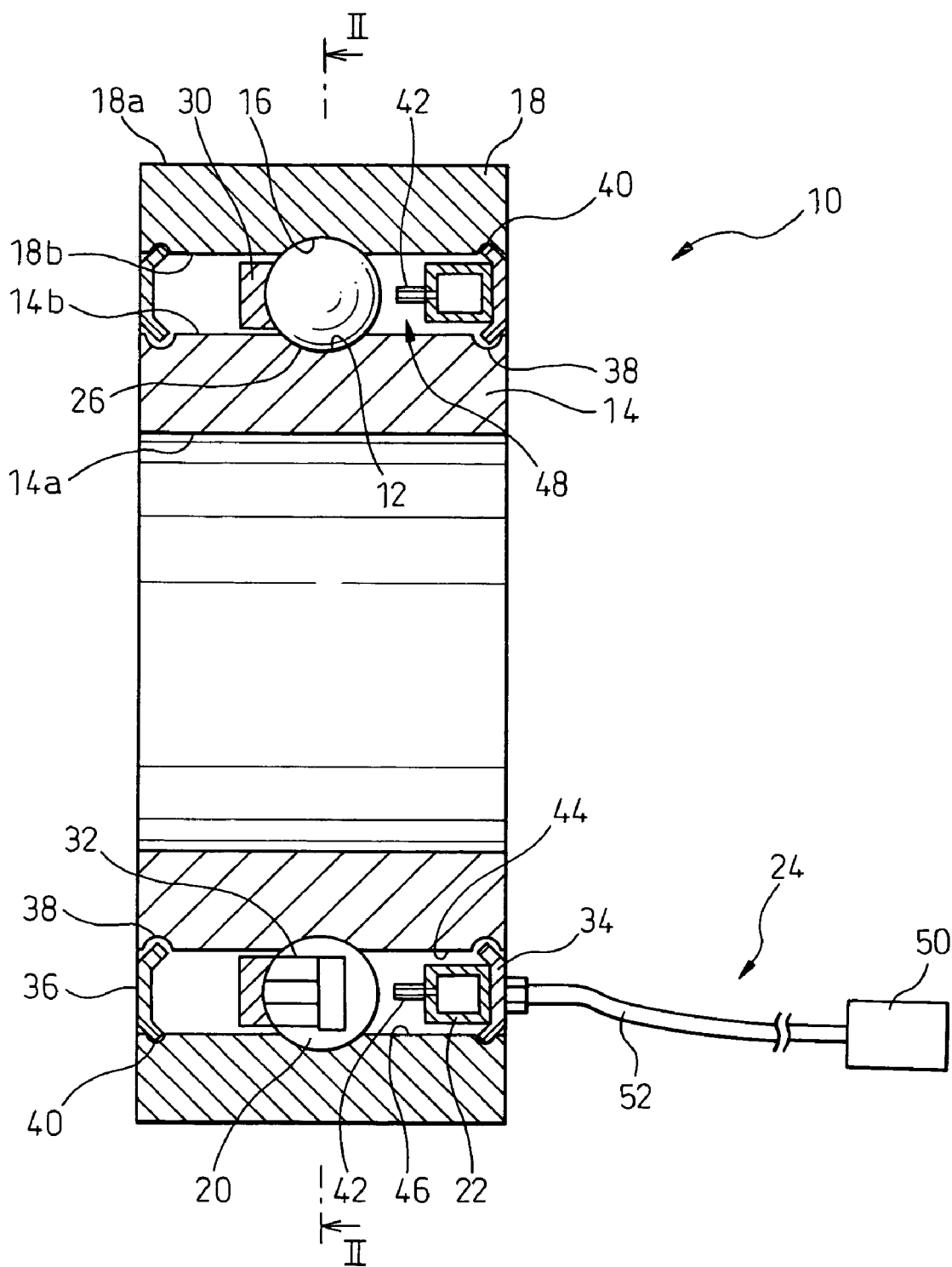
FIG. 1 is a sectional view schematically showing a rolling bearing system according to a first embodiment of the present invention.

The embodiments of the present invention are described below in detail, with reference to the accompanying drawings. In the drawings, the same or similar components are denoted by common reference numerals.

Figure 2:
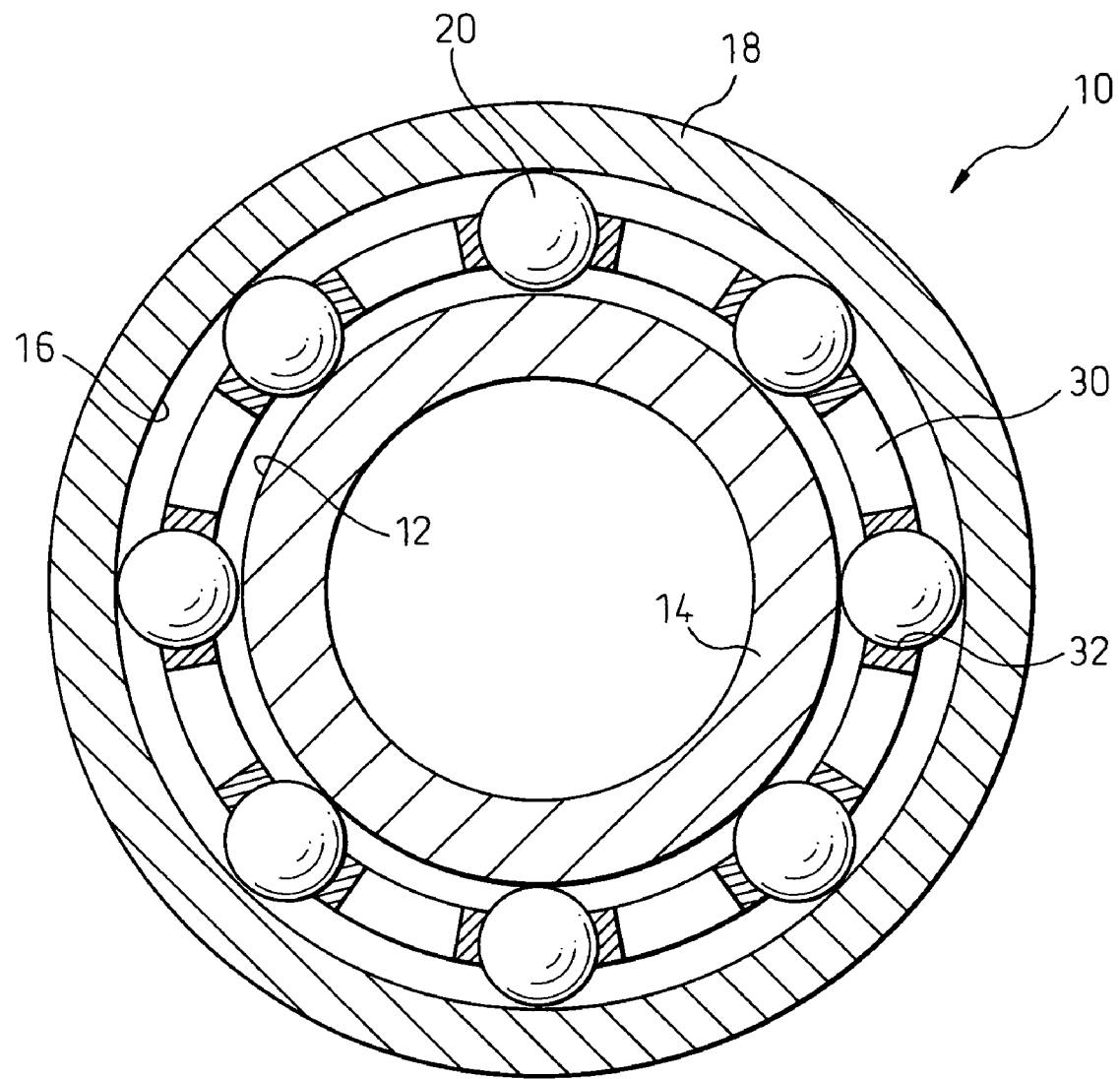
FIG. 2 is a sectional view schematically showing the rolling bearing system, taken along a line II—II of FIG. 1.

Referring to the drawings, FIGS. 1 and 2 show a rolling bearing system 10 according to a first embodiment of the present invention. The rolling bearing system 10 may be incorporated in, e.g., an electric motor and used to rotatably support a rotor shaft in a housing constituting a stator. It should be noted that the rolling bearing system according to the present invention may be useful in various applications, and is suitable especially for an application, such as an electric motor, in which a shaft rotating at high speed in a high-temperature environment provided should be supported.

The rolling bearing system 10 is provided with an inner ring 14 including a first raceway surface 12, an outer ring 18 including a second raceway surface 16, a rolling element 20 retained between the inner ring 14 and the outer ring 18 and capable of rolling along the first raceway surface 12 and the second raceway surface 16, a grease tank 22 arranged between the inner ring 14 and the outer ring 18 for storing a grease, and a grease pressing mechanism 24 for pushing the grease stored in the grease tank 22 out of the grease tank 22 to supply the grease to the rolling element 20, the first raceway surface 12 and the second raceway surface 16.

The inner ring 14 includes an annular inner peripheral surface 14a secured to, e.g., a rotor shaft of an electric motor, and an annular outer peripheral surface 14b opposite to the inner peripheral surface 14a. A recess 26 having an arcuate sectional shape, which includes the first raceway surface 12, is formed at a generally axial center of the annular outer peripheral surface 14b over an entire circumference of the peripheral surface 14b. The outer ring 18 includes an annular outer peripheral surface 18a secured to, e.g., a housing adjacent to a stator of an electric motor, and an annular inner peripheral surface 18b opposite to the outer peripheral surface 18a. A recess 28 having an arcuate sectional shape, which includes the second raceway surface 16, is formed at a generally axial center of the annular inner peripheral surface 18b over an entire circumference of the peripheral surface 18b. The first raceway surface 12 of the inner ring 14 and the second raceway surface 16 of the outer ring 18 are located so as to face to each other over the entire circumferential length thereof.

An annular retainer 30 for retaining a plurality of rolling elements 20, each comprised of a ball, is disposed between the inner ring 14 and the outer ring 18. The retainer 30 includes a plurality of pockets 32 provided at regular intervals in a circumferential direction. The respective pockets 32 extend between the recesses 26, 28, so as to retain the respective rolling elements 20 in a rollable manner. Under this condition, the rolling elements 20 are kept in stable contact with the first and second raceway surfaces 12, 16 of the recesses 26, 28 and are capable of smoothly rolling while carrying a load.

As shown in FIG. 1, annular shield plates 34, 36 are arranged between the inner ring 14 and the outer ring 18 and placed at opposite axial ends of the rings 14, 18. The shield plates 34, 36 act to hold and confine the grease, as a lubricant between the surfaces of the respective rolling elements 20 and the first and second raceway surfaces 12, 16, in a space between the inner ring 14 and the outer ring 18. The inner peripheral edge and the outer peripheral edge of each shield plate 34, 36 are received respectively into engaging grooves 38, 40 formed correspondingly to the inner ring 14 and the outer ring 18. For example, each shield plate 34, 36 is fixed at the outer peripheral edge thereof to the engaging groove 40 of the outer ring 18.

Figure 3:
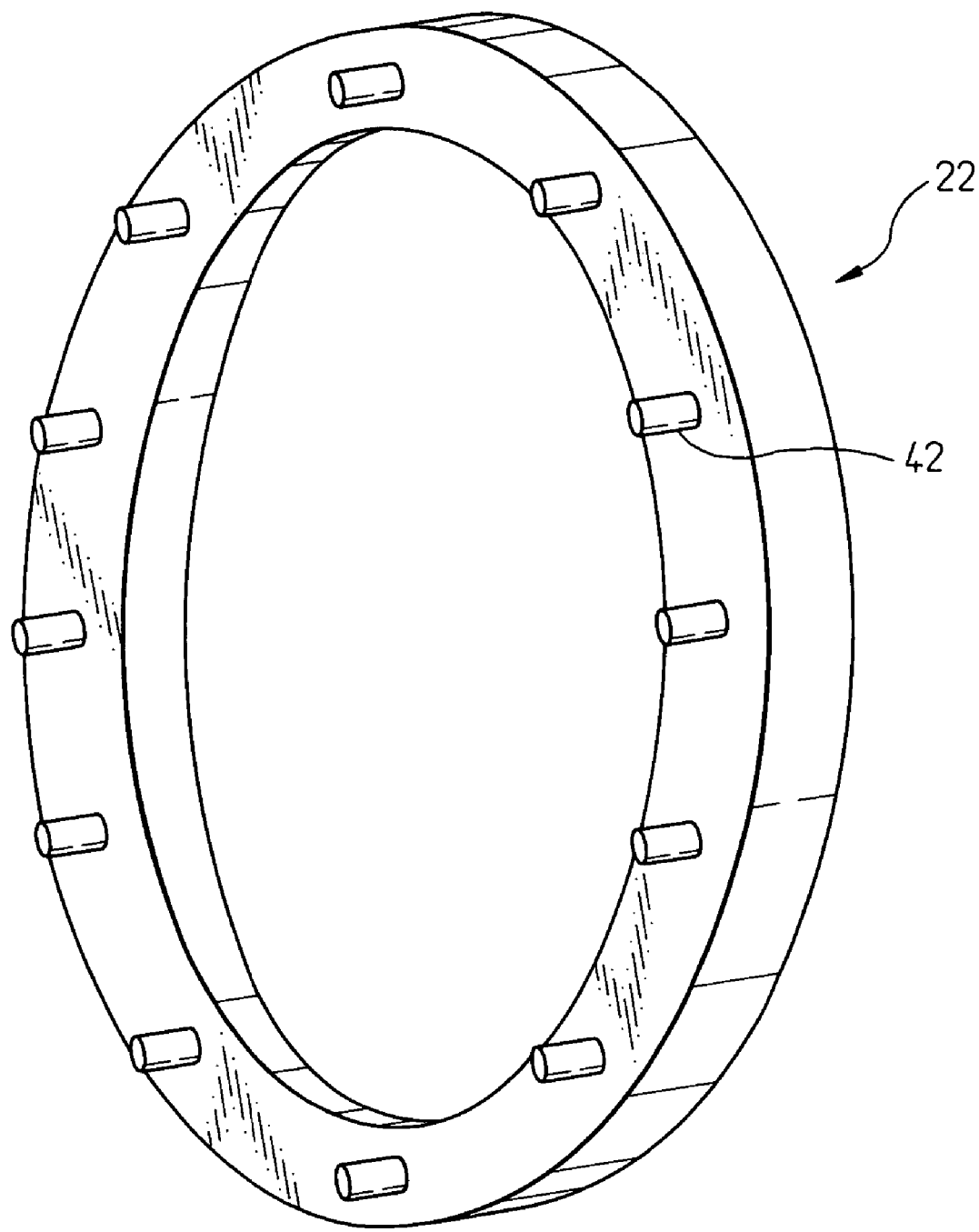
FIG. 3 is a perspective view schematically showing a grease tank provided in the rolling bearing system of FIG. 1.

The grease tank 22 is attached to the axial inner surface of one shield plate 34 (in the illustrated embodiment, the shield plate 34 arranged at the side of the pockets 32 of the retainer 30) and fixedly supported thereon. As shown in FIG. 3, the grease tank 22 has an annular shape, and at least one grease outlet 42 is provided at a predetermined circumferential position on one axial end face of the grease tank 22. In the illustrated embodiment, plural grease outlets 42 are arranged at substantially regular intervals along the circumference of the grease tank 22.

As shown in FIG. 1, the inner ring 14 includes a first extending surface 44 adjoining the first raceway surface 12, and the outer ring 18 includes a second extending surface 46 adjoining the second raceway surface 16 and facing oppositely to the first extending surface 44. The grease tank 22 is thus housed in an annular space 48 defined between the first extending surface 44 and the second extending surface 46. The grease tank 22 extends along the entire circumferences of the inner ring 14 and the outer ring 18, and the respective grease outlets 42 open toward the rolling elements 20. In this connection, the grease tank 22 is attached to the shield plate 34 in such a manner as to be free from contact with the inner ring 14 fixed to the rotor shaft.

In the above configuration, the axial dimension (i.e., the distance between opposite axial end faces) of each of the inner ring 14 and the outer ring 18 is designed to be larger than a dimension necessary to support the plural rolling elements 20. As a result, it is possible enlarge the first extending surface 44 of the inner ring 14 and the second extending surface 46 of the outer ring 18, so as to increase a volume of the grease tank 22 accommodated in the annular space 48.

The grease pressing mechanism 24 includes a compressed air source 50 connected to the grease tank 22. The grease tank 22 is connected with a tube 52 extending out of a bearing structure through the shield plate 34. The grease pressing mechanism 24 is able to supply a compressed air from the compressed air source 50 to the grease tank 22 through the tube 52, and to apply a pressure to the grease stored in the grease tank 22, so as to push out the grease through the grease outlets 42 toward the rolling elements 20.

The grease is held and confined, by the pair of shield plates 34, 36, in a space between the inner ring 14 and the outer ring 18, which includes the annular space 48. During the operating condition of the bearing system 10, when the grease pressing mechanism 24 operates to push out a new grease in the grease tank 22 through the grease outlets 42 toward the rolling elements 20 at an appropriate timing, the new grease acts to push aside the old grease surrounding the respective rolling elements 20 and thereby attaches to the rolling elements 20. The old grease pushed aside is shifted into a space at the side of the other shield plate 36, and is stored therein away from the grease tank 22.

According to the rolling bearing system 10 having the configuration described above, it is possible to supply new (or un-degraded) grease from the grease tank 22 to the surfaces of the respective rolling elements 20 as well as the first and second raceway surfaces 12, 16. As a result, it is possible to increase the grease life and thus to improve the service life of a bearing structure. Also, the provision of the grease tank 22 inside the bearing structure is able to simplify the configuration of a grease supply passage. In addition, it is possible to minimize a machining or other process for forming a lubricant storage section in the components of the bearing structure, such as a bearing ring or a rolling element. In particular, the rolling bearing system 10 of the illustrated embodiment can eliminate such post-machining.

Also, it is possible to always supply an appropriate amount of new grease to interfaces between the surfaces of the respective rolling elements 20 and the first and second raceway surfaces 12, 16 in such a manner as to push aside the old grease surrounding the respective rolling elements 20, by operating the grease pressing mechanism 24 as occasion demands. As a result, it is possible to suppress the agitation resistance of the grease, which enables the high-speed rotation of a shaft (e.g., the output shaft of an electric motor) and can reduce the agitation noise of the grease.

Also, in the configuration of the rolling bearing system 10, it is possible to provide the grease tank 22 having a comparatively large volume in the annular space 48 between the inner ring 14 and the outer ring 18, which permits a large amount of reserve grease inside the bearing structure. Further, the provision of the grease tank 22 having an annular structure makes it possible to supply the grease circumferentially throughout the space between the inner ring 14 and the outer ring 18. Furthermore, it is possible to support the grease tank 22 in a stable fashion, without adding any new parts, by using the shield plate 34 confining the grease.

Figure 4:
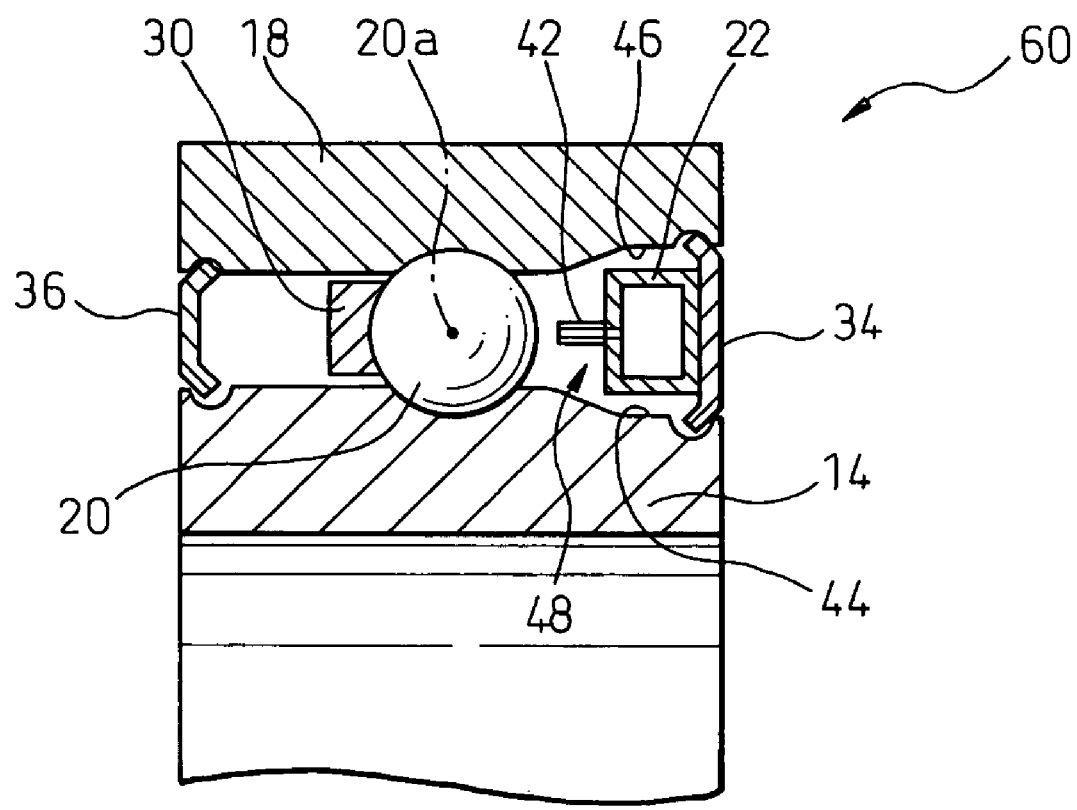
FIG. 4 is a sectional view showing an essential part of a rolling bearing system according to a second embodiment of the present invention.

FIG. 4 shows an essential part of a rolling bearing system 60, according to a second embodiment of the present invention. The rolling bearing system 60 has substantially the same configuration as the rolling bearing system 10 according to the first embodiment, except for the shapes of the first and second extending surfaces 44, 46 of the inner and outer rings 14, 18. Therefore, the corresponding components are designated by the same reference numerals and the descriptions thereof are not repeated.

In the rolling bearing system 60, both the first extending surface 44 of the inner ring 14 and the second extending surface 46 of the outer ring 18 extend in an outwardly expanding fashion as viewed from the rotational center 20a of each rolling element 20. As a result, the annular space 48 between the inner ring 14 and the outer ring 18 is further expanded in a radial direction, in comparison with the other region of the space between the inner ring 14 and the outer ring 18. The expanded annular space 48 can accommodate a grease tank 22 having an increased volume.

The rolling bearing system 60 having the above configuration also exhibits characteristic effects equivalent to those of the rolling bearing system 10 described above. Especially, in the rolling bearing system 60, an advantage is provided that it is possible to further increase the amount of reserve grease stored inside the bearing structure without increasing the axial dimension of the inner and outer rings 14, 18. In this connection, if at least one of the first extending surface 44 of the inner ring 14 and the second extending surface 46 of the outer ring 18 is formed to extend in an outwardly expanding fashion as viewed from the rotational center 20a of each rolling element 20, the annular space 48 is advantageously expanded in the radial direction.

Each of the above-described embodiments is not limited to the illustrated configuration. For example, in the rolling bearing system 10 as described above, the number of the grease outlets 42 of the grease tank 22 may be optionally selectable. Also, the present invention is applicable to a bearing structure including a roller as a rolling element, instead of the ball-shaped rolling element 20. Further, the grease pressing mechanism 24 is not limited to the configuration using compressed air supplied from the compressed air source 50, but may use a pressing force of, e.g., a spring.

Figure 5:
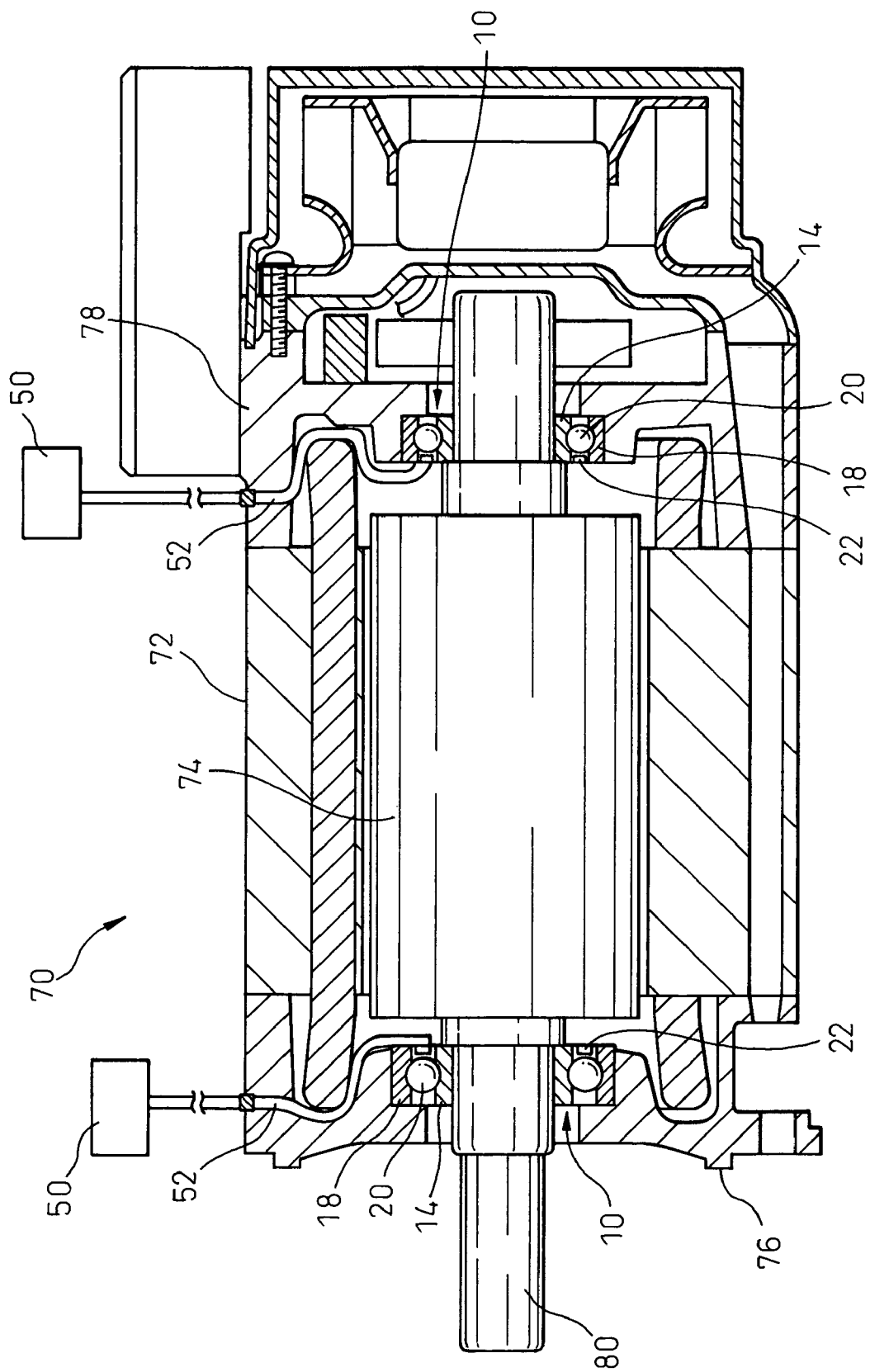
FIG. 5 is a sectional view schematically showing an electric motor according to an embodiment of the present invention.

FIG. 5 shows an electric motor 70, according to an embodiment of the present invention, which is provided with a rolling bearing system 10 as described above. The electric motor includes a stator 72, a rotor 74, a pair of front and rear housings 76, 78 fixedly supporting the stator 72, and a pair of rolling bearing systems 10 for rotatably supporting the rotor 74 relative to the stator 72 on the housings 76, 78. Each of the rolling bearing systems 10 is arranged so that the outer ring 18 thereof is secured to each housing 76, 78 and the inner ring 14 is secured to a shaft 80 of the rotor 74. A tube 52 is laid in the front housing 76 so as to be connected to a grease tank 22 in the front-side rolling bearing system 10, while a tube 52 is laid in the rear housing 78 so as to be connected to a grease tank 22 in the rear-side rolling bearing system 10. The respective rolling bearing systems 10 are able to supply a compressed air, from a compressed air source 50 outside of the electric motor 70, to the respective grease tanks 22 through the tubes 52 at a desired timing.

The electric motor 70 having the above configuration possesses an excellent reliability, due to the rolling bearing system 10 incorporated therein, which improves the life of the bearing structure by a simple configuration.

While the invention has been described with reference to specific preferred embodiments, it will be understood by those skilled in the art that various changes and modifications may be made thereto without departing from the spirit and scope of the following claims.

The invention claimed is:

1. A rolling bearing system, comprising:
    an inner ring including a first raceway surface;
    an outer ring including a second raceway surface;
    a rolling element retained between said inner ring and said outer ring and capable of rolling along said first raceway surface and said second raceway surface;
    a grease tank arranged between said inner ring and said outer ring for storing a grease; and
    a grease pressing mechanism for pushing said grease stored in said grease tank out of said grease tank to supply said grease to said rolling element, said first raceway surface and said second raceway surface.

2. A rolling bearing system as set forth in claim 1, wherein said inner ring includes a first extending surface adjoining said first raceway surface, wherein said outer ring includes a second extending surface adjoining said second raceway surface and facing oppositely to said first extending surface, and wherein said grease tank is housed in an annular space defined between said first extending surface and said second extending surface.

3. A rolling bearing system as set forth in claim 2, wherein at least one of said first extending surface and said second extending surface extends in an outwardly expanding fashion as viewed from a rotational center of said rolling element.

4. A rolling bearing system as set forth in claim 1, wherein said grease tank has an annular shape extending along entire circumferences of said inner ring and said outer ring, and wherein at least one grease outlet for expelling said grease is formed at a predetermined circumferential position on said grease tank to open toward said rolling element.

5. A rolling bearing system as set forth in claim 1, further comprising a shield plate arranged between said inner ring and said outer ring for holding said grease between said inner ring and said outer ring, wherein said grease tank is fixedly supported on said shield plate.

6. A rolling bearing system as set forth in claim 1, wherein said grease pressing mechanism includes a compressed air source connected to said grease tank.

7. An electric motor, comprising:

a stator;

a rotor; and a rolling bearing system as set forth in claim 1, for rotatably supporting said rotor relative to said stator.

* * * * *